(12) United States Patent
Cael

(10) Patent No.: US 9,708,081 B2
(45) Date of Patent: Jul. 18, 2017

(54) RADIATOR WITH REDUCED INSOLATION FOR SATELLITE AND SATELLITE PROVIDED WITH SUCH A RADIATOR

(71) Applicant: AIRBUS DEFENCE AND SPACE SAS, Les Mureaux (FR)

(72) Inventor: Philippe Cael, Lauzerville (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/037,479

(22) PCT Filed: Dec. 19, 2014

(86) PCT No.: PCT/EP2014/078838
§ 371 (c)(1),
(2) Date: May 18, 2016

(87) PCT Pub. No.: WO2015/101531
PCT Pub. Date: Jul. 9, 2015

(65) Prior Publication Data
US 2016/0297551 A1 Oct. 13, 2016

(30) Foreign Application Priority Data

Dec. 31, 2013 (FR) .................................. 13 63734

(51) Int. Cl.
*B64G 1/22* (2006.01)
*B64G 1/50* (2006.01)
(Continued)

(52) U.S. Cl.
CPC ............. *B64G 1/503* (2013.01); *B64G 1/222* (2013.01); *B64G 1/1007* (2013.01);
(Continued)

(58) Field of Classification Search
CPC ............ B64G 1/503; B64G 1/222; B64G 1/44
See application file for complete search history.

(56) References Cited

U.S. PATENT DOCUMENTS

| 3,530,009 A | 9/1970 | Linkous et al. | |
| 5,895,014 A * | 4/1999 | Sullivan | B64G 1/24 244/168 |

(Continued)

FOREIGN PATENT DOCUMENTS

| EP | 1199250 | 4/2002 |
| WO | 9919212 | 4/1999 |

OTHER PUBLICATIONS

International Search Report PCT/EP2014/078838 dated Mar. 26, 2015.

*Primary Examiner* — Brian M O'Hara
*Assistant Examiner* — Michael Kreiner
(74) *Attorney, Agent, or Firm* — Young & Thompson

(57) ABSTRACT

A radiator for a satellite intended for being placed in geostationary orbit around the earth in a tilted plane relative to the plane of the ecliptic, includes at least one panel having at least one radiative surface, and including: a mounting foot supporting the panel; and control and motor elements for pivoting the mounting foot about an axis of rotation tilted relative to the radiative surface which is perpendicular to a radiation axis, the radiation axis and the axis of rotation being tilted relative to one another by a non-zero working angle, corresponding to the tilt angle of the plane of the orbit of the satellite relative to the plane of the ecliptic, the working angle being fixed, such that for any rotation of the mounting foot about the axis of rotation owing to the control and motor elements, the radiative surface remains parallel to the plane of the ecliptic.

20 Claims, 18 Drawing Sheets

(51) Int. Cl.
*B64G 1/10* (2006.01)
*B64G 1/44* (2006.01)
*B64G 1/58* (2006.01)

(52) U.S. Cl.
CPC .............. *B64G 1/1014* (2013.01); *B64G 1/44* (2013.01); *B64G 1/58* (2013.01)

(56) References Cited

U.S. PATENT DOCUMENTS

| | | |
|---|---|---|
| 6,669,147 B2 | 12/2003 | Bertheux et al. |
| 7,874,520 B2 | 1/2011 | McKinnon et al. |
| 2002/0119750 A1* | 8/2002 | Youssefi .................. B64G 1/24 455/12.1 |
| 2013/0200221 A1 | 8/2013 | Goodzeit et al. |

* cited by examiner

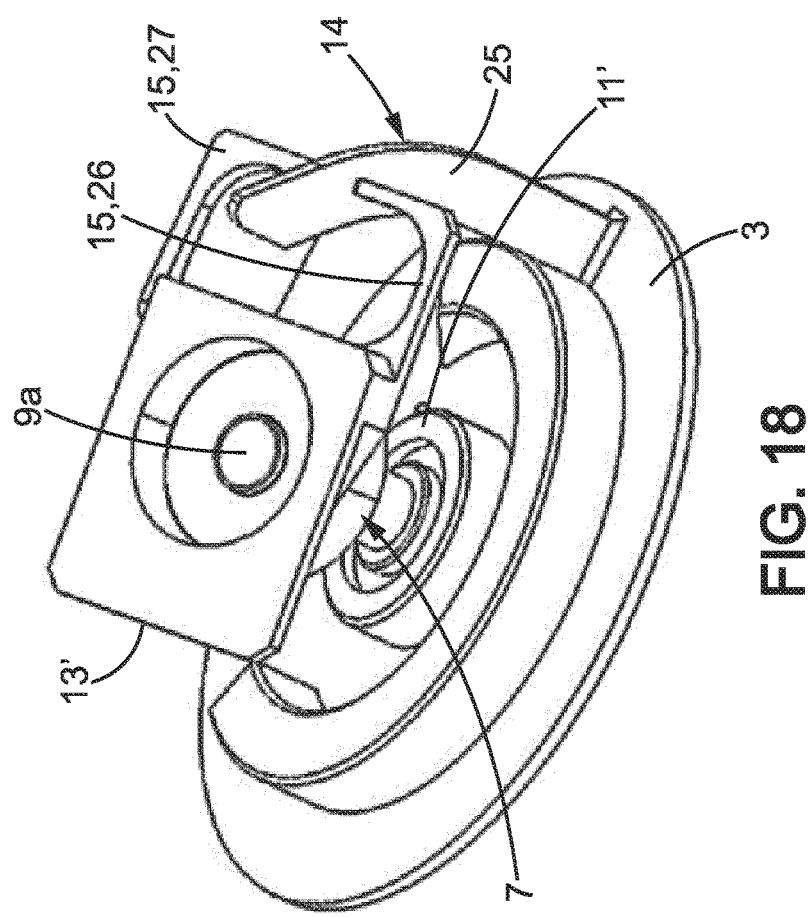
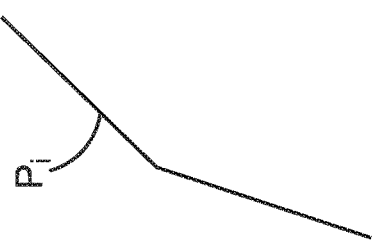
FIG. 18

RADIATOR WITH REDUCED INSOLATION FOR SATELLITE AND SATELLITE PROVIDED WITH SUCH A RADIATOR

FIELD OF THE INVENTION

The invention relates to the field of artificial satellites, such as in particular telecommunications satellites, in geostationary orbit around a planet, typically the earth. More specifically, the invention relates to a radiator or a set of radiators for such a satellite.

BACKGROUND OF THE INVENTION

Such a satellite is typically in the form of a rectangular parellelipiped, on which a north face and a south face, an east face and a west face, an earth face and an anti-earth face are defined. The north, south, east and west faces are thus named to correspond to the cardinal points of the planet around which the satellite is placed. The earth face is the one facing towards the earth; the anti-earth face is the opposite face. These orientations can be somewhat skewed with respect to their definition in order to meet certain operational or positioning constraints.

A severe constraint on a satellite concerns the thermal control of the different constituent parts and the dissipation of the heat load generated by these different constituent parts. The heat must then be removed from the satellite into space by radiation, by means of radiators, in order to maintain the equipment within an acceptable temperature range. The efficiency of a radiator in terms of thermal rejection capacity thus increases the less it is subject to solar radiation, also known as insolation. A solution for minimizing the insolation of the radiators is to place the radiative surfaces, i.e. the useful area of the radiator for removing heat, parallel to the north and south faces of the satellite.

A radiator is generally presented in the form of a panel, one or both faces of which form the radiative surfaces. A heat-transfer fluid flows between the various items of equipment of the satellite where it is heated, and passes to the radiative surfaces where it is cooled. The radiator can be mounted directly on the north face or the south face of the satellite, i.e. the radiative surface of the radiator is merged with the north face, or the south face, of the satellite. In particular in the case of deployable radiators, the radiative surfaces are not merged with a face of the satellite. Fluid connection means are then put in place outside the satellite, between the satellite and the radiator.

However, the satellite in orbit around the earth remains within a plane known as the tilted orbit plane relative to the sun's rays, as a result of the tilt of the axis of rotation of the earth on itself. For a geostationary satellite, the orbit of the satellite is in an equatorial plane, the tilt of which relative to the ecliptic plane is therefore 23.5°. Depending on the season, the solar incidence on the radiators parallel to the north and south faces of the satellite will thus vary from −23.5° to +23.5°. These two maximum values are reached at the solstices, and pass through the value of 0° at the equinoxes. Consequently, even if the radiative surfaces are placed parallel to the north and south faces of the satellite, they still receive a non-negligible part of the solar radiation, diminishing the efficiency of the radiator despite the presence of thermal blankets reducing the solar absorptivity.

Another constraint on a satellite concerns the space requirement. The satellite contains various items of equipment and in particular antennas, the field of view of which must be clear, for example of plasma thrusters, generating jets capable of damaging the equipment close by, or of solar panels, the surface area exposed to the sun of which must be as large as possible. Moreover, these items of equipment must also be taken into account in the launch phase of the satellite, during which the satellite is installed in a launcher and must be compatible with the effective volume. Generally, the items of equipment are then folded, and subsequently deployed once the satellite is launched into orbit. It can thus be understood that the greater the space requirement of the satellite, the more difficult it is to place it in the launcher. The radiators add to the space requirement.

Thus, the design and positioning of a radiator on a satellite must take account of this double constraint: minimizing the solar radiation received by the radiator while still taking account of the space requirement on the satellite.

Several solutions have already been proposed in the past.

A first solution is described in document U.S. Pat. No. 6,669,147, describing a deployable radiator for a satellite, mounted by means of a hinge, the angle of which is tilted relative to the principal axes of the satellite. The radiator would then not obstruct the other items of equipment. It is specified that when the radiator is pivoted by a motor on one axis, then its insolation can be reduced, but the insolation can only be reduced to zero by pivoting it on two axes. A mechanism is therefore proposed making it possible to obtain two axes of rotation of the radiator, in which a first annular part houses a motor for pivoting an intermediate part about a first axis. The mechanism also comprises a second annular motor, housed in the intermediate part in order to pivot a third part about a second axis.

Document U.S. Pat. No. 7,874,520 also proposes a deployable radiator, hinged on the satellite on two universal-joint type connectors, such that the radiator can be pivoted about a first axis and about a second axis, tilted relative to the first axis.

These two solutions thus make it possible, by means of pivoting the radiator relative to two axes, to reduce or even eliminate the insolation of the radiative surface of the radiator.

However, these solutions have the drawback of being complex. They involve taking account of two independent degrees of freedom in rotation, such that the control mechanism(s) are formed of several parts in order to achieve the result, increasing the space requirement and the costs. Moreover, the solutions with two axes of the state of the art pose a problem as regards passing the fluid connections between the satellite and the radiative surfaces of the radiator, as the connections must follow the two degrees of freedom in rotation. The pipes also undergo severe stresses due to the movements that they must follow, which can accelerate their wear. Generally, solutions are therefore developed that are specific to the fluid connections, increasing the costs of the satellite.

There is a need for a new radiator for a satellite providing in particular a solution to the aforementioned drawbacks.

SUMMARY OF THE INVENTION

Thus, a first object of the invention is to propose a radiator for a satellite for which the insolation of the radiative surfaces is zero, with a simple mechanism.

A second object of the invention is to propose a radiator for a satellite, the space requirement of which is reduced.

A third object of the invention is to propose a radiator for a satellite for which the fluid connections can easily be put in place.

A fourth object of the invention is to propose a radiator for a satellite that only slightly increases the costs of the satellite.

A fifth object of the invention is to propose a compact radiator for a satellite minimizing the effective volume occupied in the launching phase.

According to a first aspect, the invention proposes a radiator for a satellite intended to be stationed in geostationary orbit around the earth in a plane that is tilted relative to the ecliptic plane. The radiator comprises at least one panel having at least one radiative surface, and also comprises:

a support member bearing the panel,
control and motorization means to pivot the support member about an axis of rotation.

The axis of rotation is tilted relative to the radiative surface and the radiative surface of the panel is perpendicular to an axis of radiation, the axis of radiation and the axis of rotation being tilted relative to each other by a non-zero operating angle, corresponding to the tilt angle of the plane of the orbit of the satellite relative to the ecliptic plane. The operating angle is fixed, i.e. it is determined at the time of design, and is not altered when the radiator is in operation. Thus, for any rotation of the support member about the axis of rotation by means of the control and motorization means, the radiative surface remains parallel to the ecliptic plane.

The radiator thus comprises a single axis of articulation, namely the axis of rotation of the support member. The fixed tilt of the radiative surface ensures, simply and cheaply, zero insolation thereof. By choosing an operating angle equal, or almost equal, to 23.5°, the insolation, and therefore the heating, of the radiative surface is close to zero, increasing the efficiency of the radiator for cooling the satellite. Thus, a single motor is required to control the single degree of freedom in rotation of the radiator. The design is thus simplified.

The term "geostationary orbit" is not restricted to strictly equatorial orbits, but also refers to orbits that are slightly tilted relative to the earth's equator (by +/−3° or even +/−5°). In nominal operation, controlling the orbit known as north-south allows a slight tilt to be maintained relative to the equatorial plane. Nevertheless for certain missions, a greater tilt may be acceptable. This is often the case at the end of life of the satellite, when this orbit control is stopped and satellite mission may continue for some time. Sometimes, a slightly tilted orbit is acceptable at the start of life of the satellite. If the radiator is to be optimized for this type of orbit, the operating angle is then different from 23.5°.

According to an embodiment, the panel is mounted pivoting about the axis of radiation. The radiator also comprises a system for guiding the range of movement of the panel, limiting the rotation of the panel about the axis of rotation, so as to maintain the panel in a given orientation with respect to the satellite.

In this case, the support member can comprise two portions, namely:

a first portion capable of being mounted on the support face of the satellite,
a second portion on which the panel is mounted.

The panel is then mounted on the second portion via a bearing in order to allow the rotation of the panel about the axis of rotation. Guidance of the range of movement makes it possible in particular to control the space requirement generated by the radiator.

For example, the two portions of the support member are rectilinear and each an extension of the other, the first portion extending along the axis of rotation and the second portion extending along the axis of radiation.

More specifically, the system for guiding the range of rotation can comprise a rail, extending parallel to the axis of rotation, and a clamp fixed rigidly to the panel, the arms of the clamp engaging with the rail in order to limit the range of rotation of the panel about the axis of rotation.

According to an example, the operating angle is 23.5°. However, the operating angle can be greater than 23.5° for operation in tilted orbit. In this case, the radiator then also comprises means for modulating the speed of rotation of the support member.

Advantageously, the device can also include a system making it possible to slightly alter the tilt of the radiative surfaces relative to the satellite depending on the change in the tilt of the orbit.

Advantageously, the panel comprises two parallel radiative surfaces oriented in opposite directions.

In order to overcome certain defects, which result in insolation of the radiative surfaces, the panel can comprise a deflector placed over the entire periphery, projecting relative to the radiative surface, in order to block some of the sun's rays.

The radiator can also comprise an attitude sensor linked to the control and motorization means in order to pivot the support member, so as to verify and/or control the orientation of the panel relative to the sun.

Furthermore, the radiator can comprise fluid connection means capable of being connected with additional connection means of a satellite, the fluid connection means including at least one internal circuit comprising two flexible pipes passing on the inside of the support member of the radiator, and/or at least one external circuit comprising two flexible pipes passing on the outside of the support member of the radiator.

According to a second aspect, the invention proposes a satellite capable of being placed in orbit around the earth, and comprising at least one radiator as presented above. The radiator is mounted on a support face of the satellite, the support member of the radiator being fixed on the satellite such that the axis of rotation is perpendicular to a reference face of the satellite, the reference face being a north face or a south face of the satellite.

The radiator can advantageously adopt a folded position on the satellite in which the panel is against the support face of the satellite on which it is fixed, and a deployed position in which the panel is brought to a position in which it is tilted relative to the support face by the operating angle.

BRIEF DESCRIPTION OF THE DRAWINGS

Other advantages will become apparent in the light of the description of particular embodiments of the invention accompanied by the figures, in which:

FIGS. 18 to 20 are views similar to that in FIG. 17, the radiator being respectively in three different positions.

DETAILED DESCRIPTION

Figure 1:
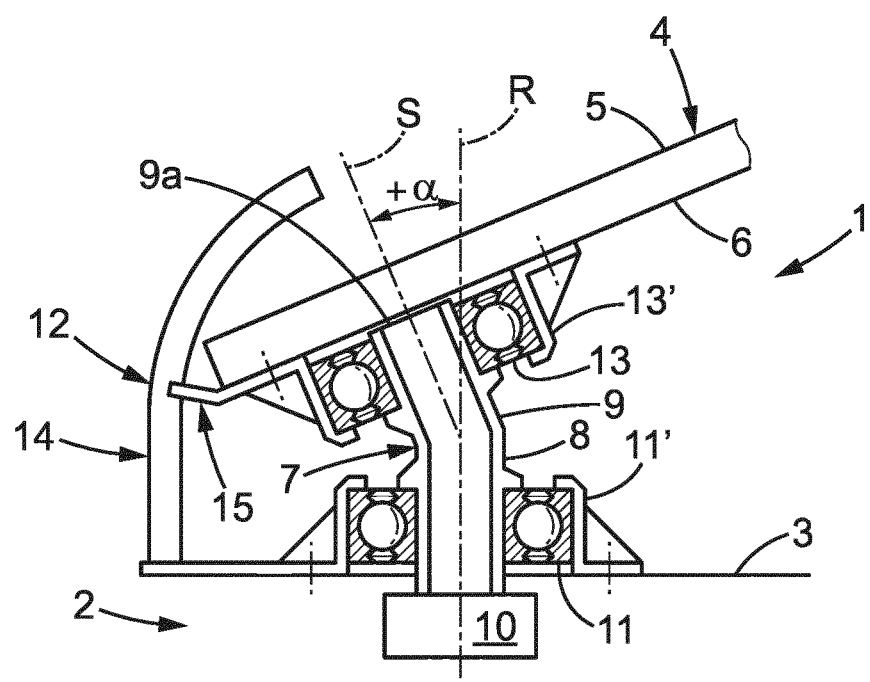
FIG. 1 is a diagrammatic cross-sectional view of a radiator mounted on a face of the satellite and of its mechanism, according to an embodiment of the invention.

FIG. 1 shows, in diagrammatic cross section, an embodiment of a radiator 1, intended to be mounted in rotation about an axis of rotation R on a face of a satellite 2. The axis of rotation R of the radiator 1 once mounted on the satellite 2 is in practice oriented north-south, i.e. it is perpendicular to the north and south faces of the satellite 1. However, the face on which the radiator 1 is mounted can be any face of the satellite 2. In the embodiment of FIG. 1, this is the north face 3 of the satellite 1. The purpose of the satellite 2 is in particular to be placed in geostationary orbit around the earth T.

The radiator 1 comprises a panel 4, which has at least one substantially flat radiative surface 5. Preferably, the two opposite faces 5, 6 of the panel 4 are radiative surfaces. The radiative surfaces 5, 6 are oriented by a single axis S called axis of radiation, i.e. the axis perpendicular to the radiative surfaces 5, 6. A first face 5 is called upper, and the second face 6 is called lower.

As will be seen below, the axis of rotation R and the axis of radiation S are tilted relative to each other by an angle different from 90°. In other words, the axis of rotation R is not parallel to the radiative surfaces 5, 6.

Preferably, the panel 4 extends on one side of the satellite 2, beyond the face of the satellite 2 on which it is mounted, so as not to obstruct other items of equipment of the satellite requiring proximity to the satellite 2, and to provide the faces 5 and 6 with a good view factor, also called form factor, towards space.

In order to be mounted on the north face 3 of the satellite 2, the radiator 1 comprises assembly means, which include a rigid support member 7, i.e. no portion of the member 7 is mobile relative to another portion.

The geostationary orbit is defined as being situated at an altitude of about 36,000 km above the equator, in the equatorial plane of the earth, and with zero eccentricity relative to the earth. Although the geostationary orbit refers to the earth, the satellite 2 equipped with the radiator 1 described herein could be adapted for other planets.

As presented in the introduction, the geostationary orbit, in the equatorial plane of the earth, is thus tilted relative to the ecliptic plane by an angle of 23.5°. Thus, the axis of radiation S is tilted by an operating angle α relative to the axis of rotation R, said angle α then being chosen to be equal to 23.5°. More generally, the operating angle α may be chosen, as required, from a range of values comprised between 0° and 90°, excluding the boundaries of the range.

The satellite 2 in geostationary orbit is oriented in such a way that its faces called north and south are parallel to the plane of the geostationary orbit, throughout its operation. Particularly for telecommunications satellites, the instruments of the antenna type are mounted on the satellite in a precise orientation, which must be maintained. Thus, the orientation of the satellite relative to the earth is generally kept identical throughout its operation.

The tilting of the axis of radiation S relative to the axis of rotation R implies that the radiative surfaces 5, 6 are tilted by the operating angle α relative to the north face 3 of the satellite 2. Thus, the radiative surfaces can remain parallel to the ecliptic plane for any rotation of the support member 7 about the axis of rotation R. Their insolation is then zero, and their thermal rejection capacity is thus maximized.

The operating angle α is fixed, i.e. it is determined at the time of design of the radiator. It is therefore not altered during the operation of the radiator. Only the rotation of the support member 7 about the axis of rotation R must be controlled in order to keep the radiative surfaces 5, 6 parallel to the ecliptic plane. The assembly means are therefore greatly simplified with respect to the state of the art involving two axes.

In a variant, provision can however be made for means for making limited alterations (of a few degrees) to this operating angle α during operation, in order to compensate for a change in the tilt of the orbit. For example a two-position device can be used. More specifically, as will be seen below, it is not the operating angle α between the axis of rotation R and the axis of radiation S that is altered, but the angle between the radiative surfaces 5, 6 and the north face 3 of the satellite, such that, by compensation, the radiative surfaces 5, 6 are brought back to the ecliptic plane.

According to the embodiment presented herein, the support member 7 comprises two rectilinear portions 8, 9, each an extension of the other. A first portion 8 extends along the axis of rotation R, and the second portion 9 extends along the axis of radiation S. The two portions 8, 9 of the member 7 are thus tilted in relation to each other by the operating angle α. The first portion 8 is mounted on the north face 3 by means of a bearing 11, and is connected to control and motorization means 10. The first portion 8 extends substantially perpendicular to the north face 3. For example, the inner ring of the bearing is fixed on the member 7, and the outer ring is fixed on the north face 3 of the satellite. A housing 11', fixed to the outer ring, covers the bearing 11 in order to protect it. During one complete rotation of the support member 7 about the axis of rotation R, the second portion 9 therefore describes a cone, having an angle equal to the operating angle α.

The first portion 8 of the member 7 is intended to be mounted on the north face 3 of the satellite 2, about the axis of rotation R. The panel 4 is fixed on the second portion 9 of the member 7. In practice, the panel 4 tops the second portion 9, i.e. it is fixed to the free end 9a of the second portion 9.

In a variant, the support member 7 can be curved. In this case, the curve described by the support member 7 comprises at least one first tangent substantially parallel to the axis of rotation R and a second tangent tilted by the operating angle α relative to the first tangent. The panel 4 is then mounted perpendicular to the second tangent.

Control and motorization means 10 are provided in order to pivot the support member 7 about the axis of rotation R.

The support member 7 can be rigidly fixed on the panel 4. In this case, for one complete rotation of the support member 7 about the axis of rotation R, the panel 4 describes a circular path having a radius corresponding to the distance between the axis of rotation R and the point of the panel 4 that is the furthest from the axis of rotation R, in a plane perpendicular to the axis of rotation R. Such a path may obstruct other items of equipment on the satellite. Such a path also limits the dimensions of the panel 4, in order to avoid collisions between the panel 4 and the satellite 2 during the rotation about the axis of rotation R.

Thus, the radiator 1 comprises a system 12 for guiding the range of rotation of the panel. The range of rotation is defined herein as being the arc of a circle described by a point of the panel 4, when viewed in a plane perpendicular to the axis of rotation R, the centre of the circle being on the axis of rotation R. The range of rotation can thus be defined by a length, which is the radius of the circle described, and by an angle, which is the swept angle on this circle: the larger this radius and this angle, the greater the range of rotation.

In order to guide the range of rotation, the panel 4 is mounted pivoting on the second portion 9 of the member 7, about the axis of radiation S. For example, a second bearing 13 between the second portion 9 of the member 7 and the panel 4 makes it possible to obtain this rotation. The outer ring of the second bearing 13 is fixed rigidly to the panel 4 via a housing 13' covering the bearing, the inner ring being secured to the support member 7.

Figure 2:
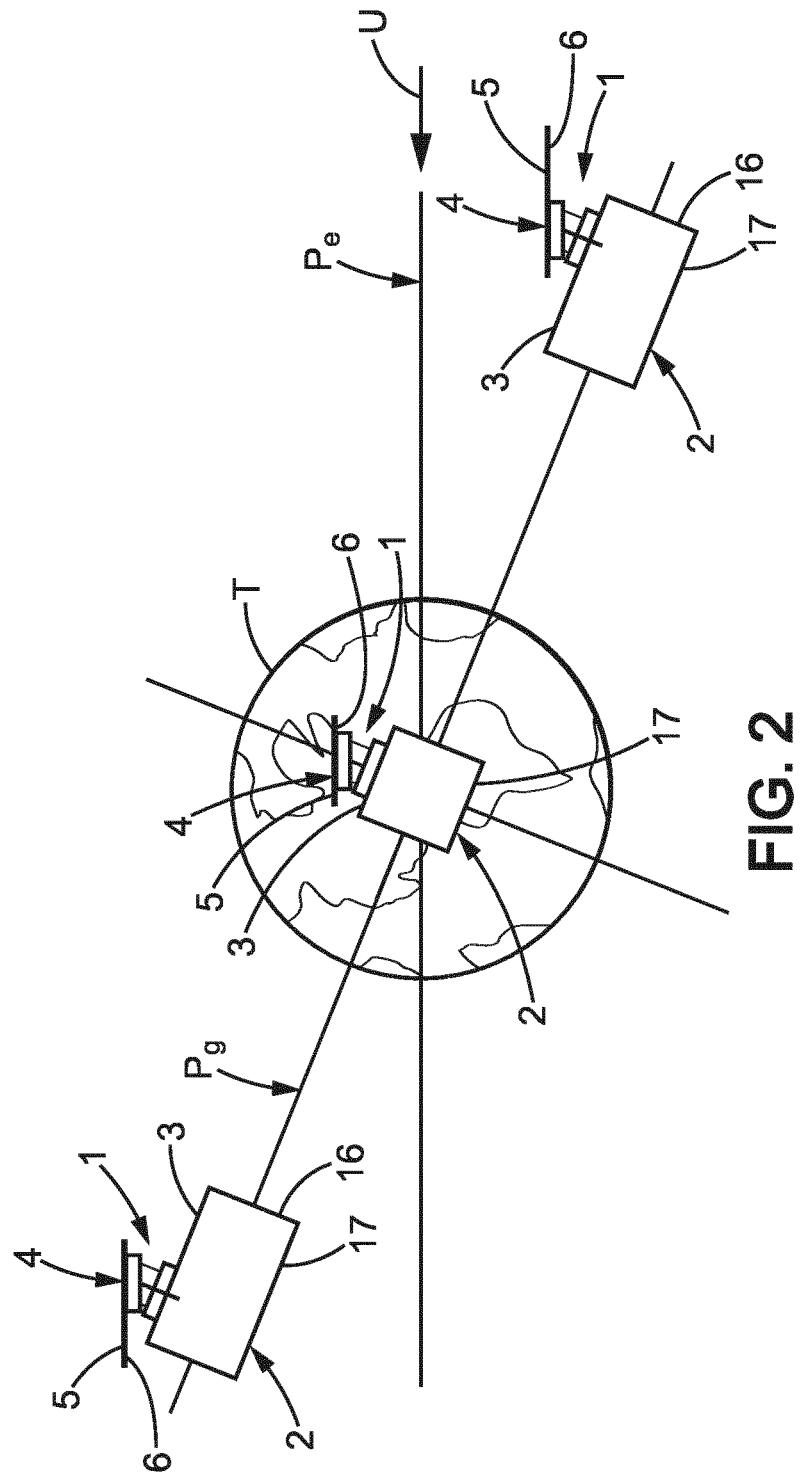
FIG. 2 is a diagrammatic representation of a satellite equipped with the radiator in FIG. 1, in orbit around the earth, the satellite being shown for three different positions around the planet, FIG. 1 showing the radiator for a position of the satellite in FIG. 2.
Figure 3:
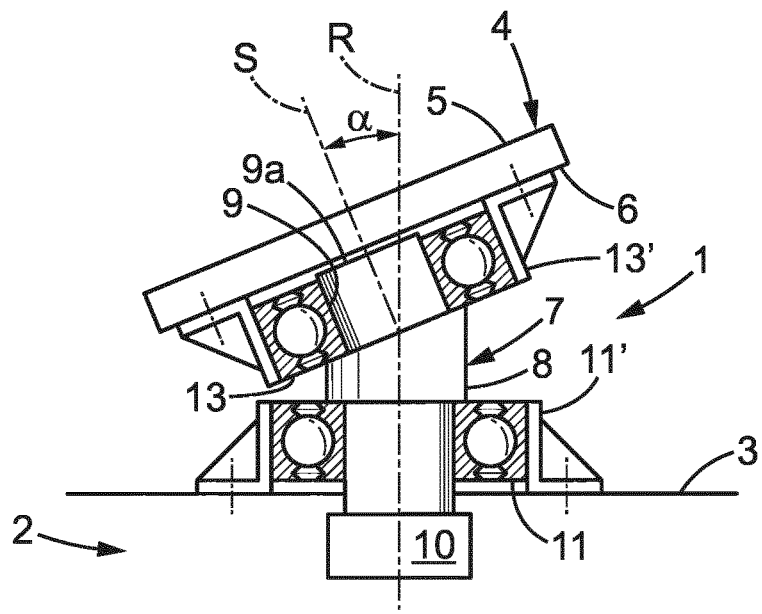
FIGS. 3 and 4 are views similar to those in FIG. 1, for the two other positions of the satellite in FIG. 2.

The guidance system 12 then comprises for example a rod forming a guide rail 14, rigidly fixed on the north face 3, and extending parallel to the axis of rotation R. An element 15 of the clamp type, rigidly fixed to the panel 4, then engages the rail 14 by gripping it on each side, in opposite directions, and limiting the angular range of rotation. Thus, the panel 4 is prevented from pivoting with the support member 7, and pivots about the axis of radiation S when the control and motorization means 10 command the rotation of the support member 7. As shown in FIGS. 1 to 3, the rail can be curved, in a manner suited to the movement of the panel 4.

In practice, a zero angular range of rotation is not always necessary, and a small range of rotation can be allowed, depending on the space requirement around the satellite 2. In this case, the panel 4 performs a rotation about the axis of rotation R when the support member 7 pivots about the axis of rotation, but only along an arc of a circle of a few degrees. The maximum amplitude of the range of rotation is, as explained above, dependent on the constraints imposed by the other items of equipment of the satellite. In practice, an angular range of rotation of less than 90° is acceptable on most satellites. However, a much smaller range of rotation will often be preferred in practice in order to reduce the space requirement generated by the range of rotation of the radiator 1.

Furthermore, the length of the range of rotation depends in particular on the length of the support member 7, and more specifically on the length of the second portion 9 of the support member 7. The greater the length of the second portion 9, the larger the radius of the circle described by the free end 9a of the second portion, leading to a much greater amplitude of the range of rotation of the panel 4.

As a result, the range of rotation can be adjusted by combining the effect of the guidance system 12, limiting the angular range of rotation, with the choice of the length of the second portion 9.

As a consequence of the system 12 for guiding the range of rotation, during the rotation of the support member 7 about the axis of rotation R, the panel 4 has a tipping movement about the axis of rotation R, in order to remain parallel to the ecliptic plane. More specifically, the radiative faces 5, 6 of the panel 4 are still tilted relative to the north face 3 of the satellite 2 by an angle equal to the operating angle α. However, the plane in which this tilting can be measured changes with the rotation of the support member 7 about the axis of rotation R, according to the orientation of the second portion 9.

FIG. 2 shows the satellite 2 diagrammatically in geostationary equatorial orbit around the earth T, in three different positions. The plane $P_g$ of the geostationary equatorial orbit of the satellite 2 is tilted relative to the ecliptic plane $P_e$ by an angle of around 23.5°.

The control and motorization means 10 are adapted so that the speed of rotation of the support member 7 follows the rotation of the earth T. More specifically, the earth T performs a complete rotation, i.e. 360°, about its axis in one day, called sidereal day, in 23 hours, 56 minutes and 4.1 seconds, as generally accepted. Moreover, the earth takes 24 hours for the sun to return to the same position relative to a single point on the earth, the earth having then performed a rotation of around 360.9856° about its axis, thus defining a solar day.

Consequently, the control and motorization means 10 are adjusted so that the support member 7 performs a complete rotation, i.e. 360°, in order to remain in geostationary orbit, in 23 hours, 56 minutes and 4.1 seconds so that the radiative surfaces 5, 6 remain parallel to the ecliptic plane $P_e$. The direction of rotation of the support member 7 is the reverse of degree of rotation of the earth T. Thus, if the earth T rotates in the trigonometric direction, the support member 7 rotates in the anti-trigonometric direction. The speed of rotation of the support member 7 is constant.

As a result of the rotation of the member 7 about a single axis, the axis of rotation R, starting from an initial position in which the radiative surfaces 5, 6 are parallel to the ecliptic plane $P_e$, and at a constant speed of rotation, the parallelism of the initial position is maintained throughout the geostationary orbit of the satellite 2, without the need for adjustments during the operation of the satellite 2.

Figure 4:
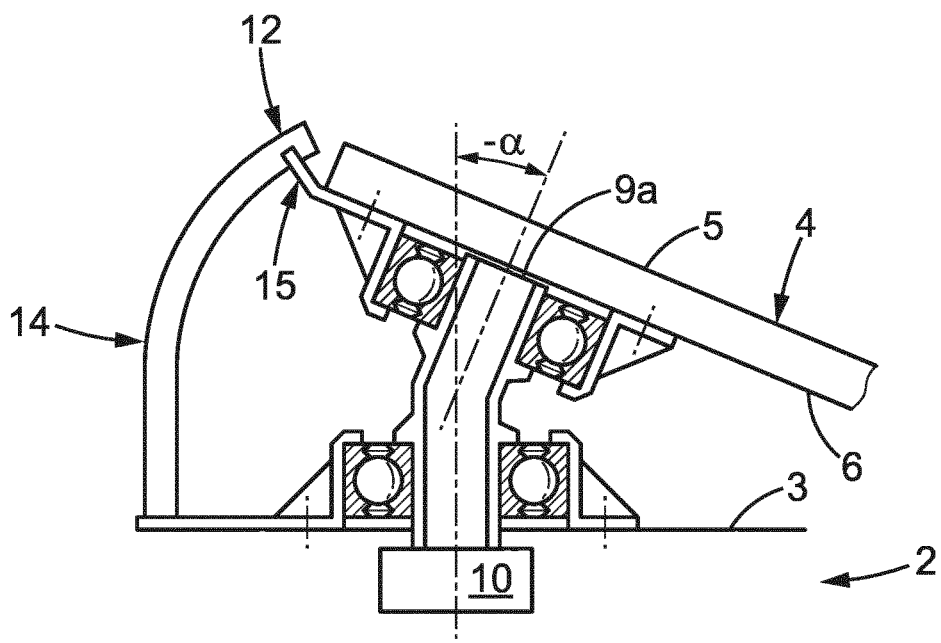

More specifically, FIG. 1 shows one of the three positions of the satellite 2, when the sun's rays U strike the satellite 2 on its earth face 16. The radiative surfaces 5, 6 are tilted by the operating angle α relative to the north face 3 of the satellite 2, when viewed in a plane parallel to the east and west faces of the satellite 2. The two tilted portions 8, 9 of the support member 7 are then located in this plane. When the satellite 2 moves on its orbit, the control and motorization means 10 drive the rotation of the support member 7 about the axis of rotation R, and the two tilted portions 8, 9 then change plane. The panel 4 tips, such that the tilt of the operating angle α between the radiative surfaces 5, 6 and the north face 3 also changes plane. For example, in FIG. 3 showing the satellite 2 after a 90° rotation on its geostationary orbit starting from the position in FIG. 1, the rays U of the satellite 2 striking it on its east or west face, the tilt of the operating angle α is in a plane parallel to the earth and anti-earth faces of the satellite 2, which is the plane containing the support member 7. When the satellite 2 describes another 90° rotation on its geostationary orbit, it is placed in a third position, shown in FIG. 4, in which the sun's rays U strike it on its anti-earth face. Thus, the tilt of the operating angle α between the radiative surfaces 5, 6 and the north face 3 is again in a plane parallel to the east and west faces of the satellite 2, the operating angle α however being the opposite of the angle in the first position. The tilt angle of the radiative surfaces 5, 6 is then denoted +α in FIG. 1, and −α in FIG. 4.

As the operating angle α corresponds to the angle between the plane $P_g$ of the geostationary orbit and the ecliptic plane $P_e$, and as the north face 3 is parallel to the plane $P_g$ of the geostationary orbit, the radiative surfaces 5, 6 are then still parallel to the ecliptic plane. The radiative surfaces 5, 6 then have zero insolation. The constant speed of rotation of the support member 7 about the axis of rotation R, following the rotation of the earth, allows the radiator 1, starting from an initial position in which the radiative surfaces 5, 6 are parallel to the ecliptic plane $P_e$, to keep the radiative surfaces 5, 6 parallel to the ecliptic plane $P_e$ when the satellite 2 follows its geostationary orbit.

Although in FIGS. 1 to 4, a single radiator is mounted, on the north face 3, in practice the satellite 2 will comprise at least one second radiator 1, mounted on the south face 17 of the satellite, which will operate identically.

Figure 5A:
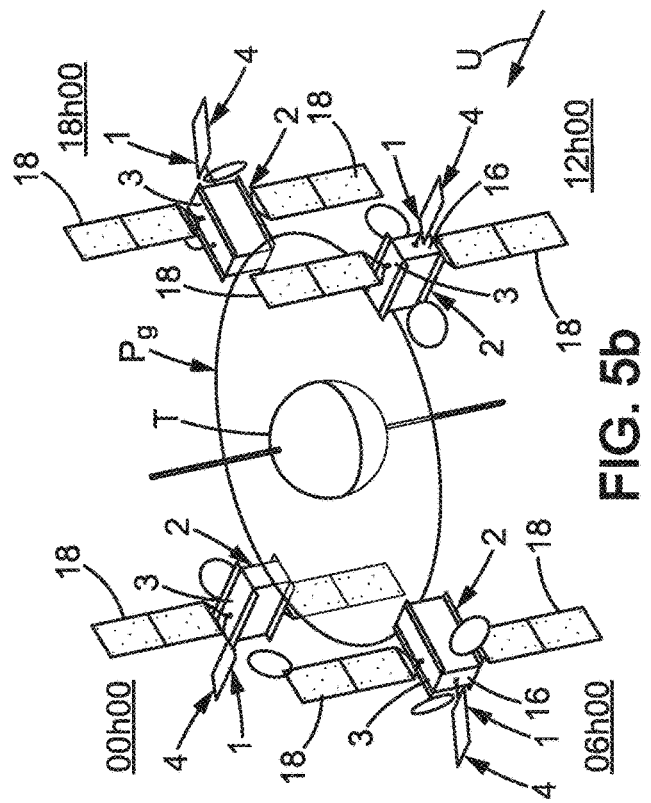
FIGS. 5a and 5b show four positions of the satellite around the earth, respectively at a solstice and at an equinox.
Figure 5B:
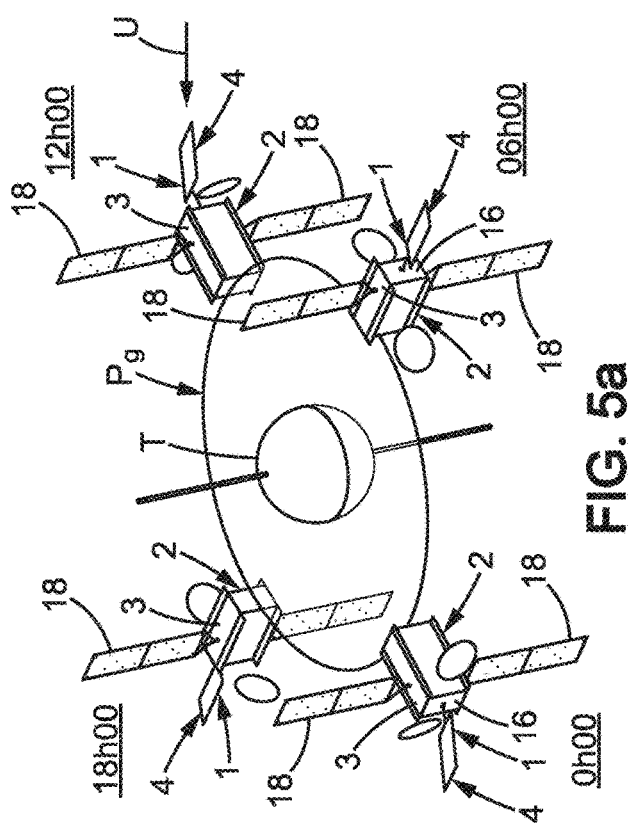
Figure 6A:
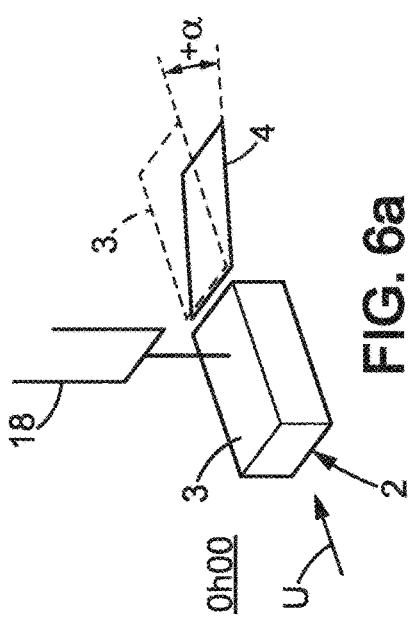
FIGS. 6a to 6d each show diagrammatically the satellite in FIG. 5b in the four positions corresponding respectively to the times 0h00, 06h00, 12h00 and 18h00.
Figure 6B:
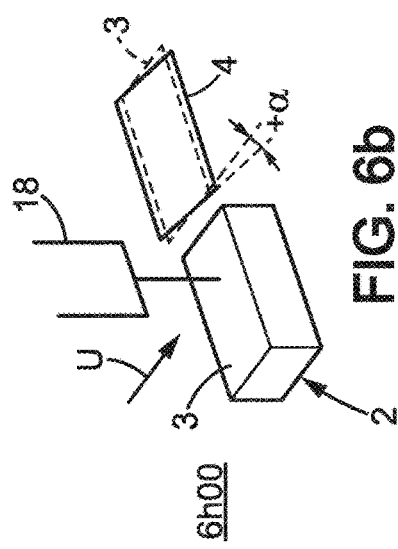
Figure 6C:
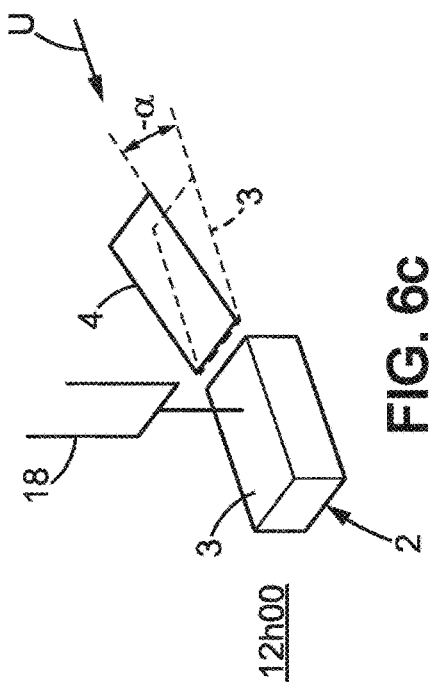
Figure 6D:
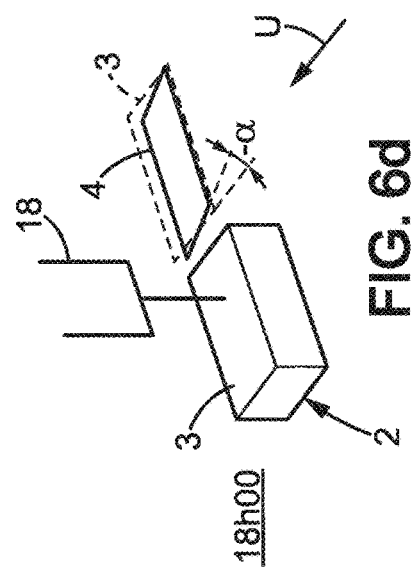

FIGS. 5a and 5b show four positions of the satellite 2 in geostationary orbit around the earth, respectively at a solstice and at an equinox, in a variant embodiment. In this variant, the radiator 1 is not mounted on the north face 3 of the satellite 2, but is mounted on the anti-earth face 16. The north face 3 and the south face 17 of the satellite 2 are generally occupied by solar panels 18, oriented so as to receive maximum insolation. Placing the support member 7 on the anti-earth face 16 does not in any way change the principle or alter the aforementioned advantages. The axis of rotation R is still oriented north-south, such that the movement of the panel 4 is identical, with the radiative surfaces 5, 6 remaining parallel to the ecliptic plane.

In FIG. 5a, at a solstice, the sun's rays U strike the earth face, on which the radiator 1 is mounted, in a first position denoted 0h00. The radiative surfaces 5, 6 are then tilted by the operating angle α relative to the north face 3, which is still parallel to the plane $P_g$ of the geostationary orbit, in a plane parallel to the east and west faces. When the satellite is moved by 90° along the geostationary orbit, it arrives at a second position marked 06h00, in which the sun's rays U strike the east face of the satellite 2. The support member 7 has followed the movement of the satellite 2, such that the radiative surfaces 5, 6 are tilted by the operating angle α relative to the north face 3 in a plane parallel to the earth and anti-earth faces. The satellite continues its orbit through 90°, in order to arrive at the third position, marked 12h00, in which the sun's rays U strike the satellite 2 on the anti-earth face. The radiative surfaces 5, 6 are again tilted in a plane parallel to the east and west faces, but by an angle α, opposite to the angle of the position 0h00. Similarly, by moving again through 90°, the satellite 2 arrives at a fourth position marked 18h, similar to that marked 06h. In this fourth position, the sun's rays U strike the satellite on the west face. The radiative surfaces 5, 6 are again tilted in a plane parallel to the earth and anti-earth faces, but by an angle α, opposite to the angle of the position marked 06h00.

In FIG. 5b, at an equinox, the radiator adopts the same positions as in FIG. 5a. The equinox does not change the principle of the radiator 1 described for a solstice. The tilt between the plane $P_g$ of the geostationary orbit and the ecliptic plane $P_e$ does not change between the solstices and the equinoxes. Thus, the operating angle α is not changed during the solar year. Once again, the radiator 1 does not then need any maintenance to take account of the changes of position of the sun relative to the earth.

Yet more specifically, FIGS. 6a to 6d show the four positions of the satellite in FIG. 5b. The north face 3 of the satellite, parallel to the plane $P_g$ of the geostationary orbit, is shown in dotted lines close to the panel 4, in order to illustrate the tilt of the radiative surfaces 5, 6. Thus, a first position marked 000h is identical to the position marked 18h00 in FIG. 5a, the tilt between the radiative faces 5, 6 and the north face 3 being denoted +α in a plane parallel to the east and west faces. A second position marked 06h00 is identical to the position marked 0h00 in FIG. 5a, the tilt between the radiative faces 5, 6 and the north face 3 being denoted +α in a plane parallel to the earth and anti-earth faces. A third position marked 12h00 is identical to the position marked 06h00 in FIG. 5a, the tilt between the radiative faces 5, 6 and the north face 3 being denoted −α in a plane parallel to the east and west faces. A fourth position marked 18h00 is identical to the position marked 12h00 in FIG. 5a, the tilt between the radiative faces 5, 6 and the north face 3 being denoted −α in a plane parallel to the earth and anti-earth faces.

As previously, although the satellite 1 in FIGS. 5 to 6 comprises a single radiator 1, mounted on the anti-earth face 16, in practice the satellite can comprise two radiators 1 mounted on the anti-earth face, so as to leave the earth face available for the arrangement of the antennas for communication with the earth.

The speed of rotation of the solar panels 10 is different from that of the radiators 1. Whereas the radiators perform a 360° rotation in 23 hours, 56 minutes and 4.1 seconds in order to follow the geostationary orbit, and keep the radiative surfaces 5, 6 parallel to the ecliptic plane $P_e$, the solar panels 18 remain perpendicular to the sun's rays. The solar panels 18 must therefore follow the solar day, i.e. pivot by 360.9856° in 24 hours.

In order to monitor the correct positioning of the panel relative to the ecliptic plane, the radiator can also comprise at least one attitude sensor, connected to the control and motorization means 10, so as to verify and/or control the orientation of the panel relative to the sun. The attitude sensor makes it possible to verify the absence of insolation on the radiative surfaces 5, 6, and to communicate with the control and motorization means 10 in order to carry out any corrective operations on the rotation of the support member 7.

Figure 7:
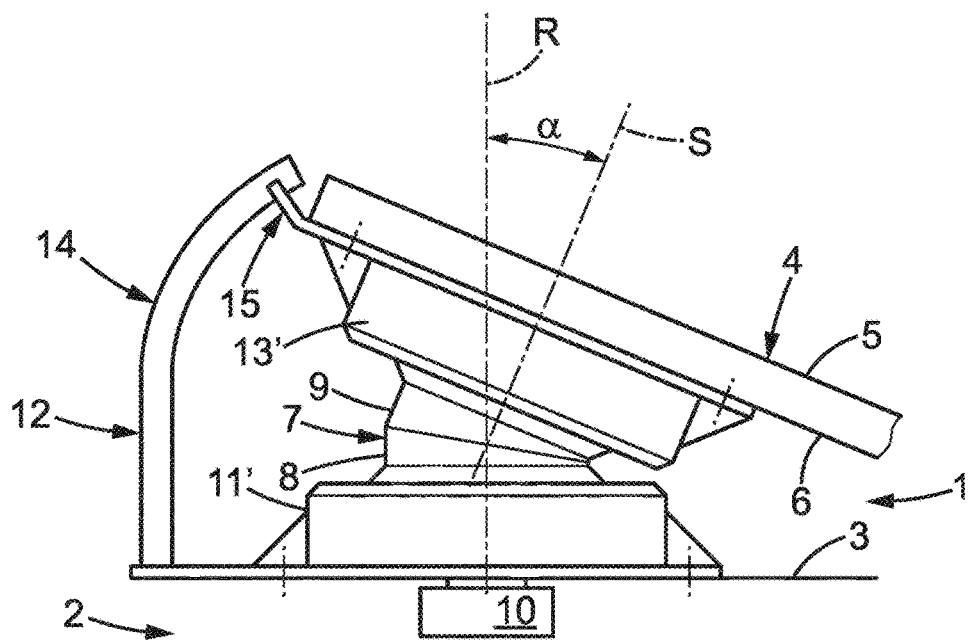
FIG. 7 is a complete side view of the radiator in FIGS. 1 to 6.
Figure 8:
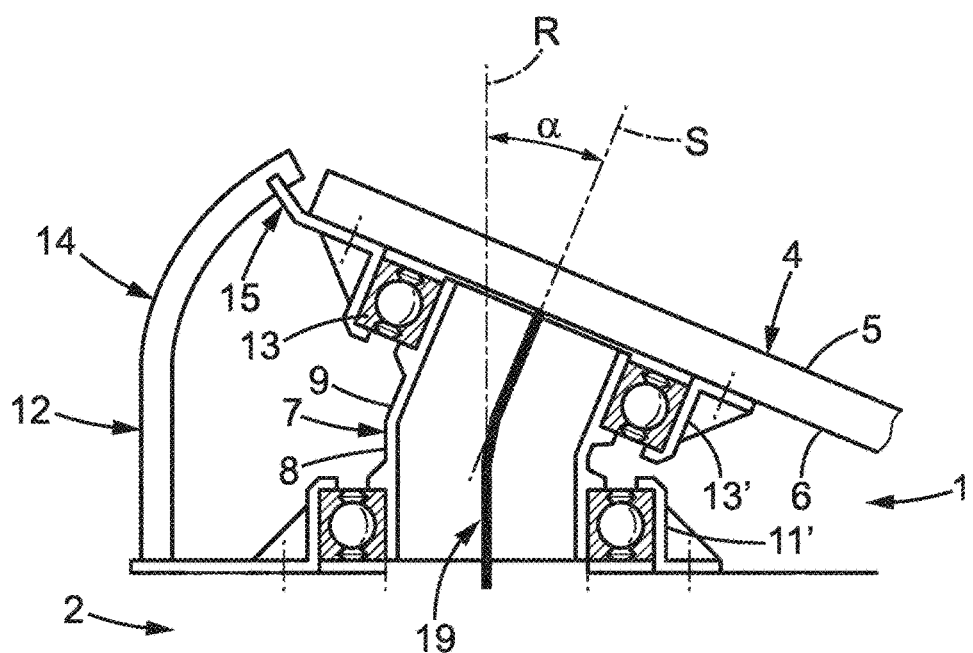
FIG. 8 is a cross-sectional view of FIG. 7, showing the passage of the fluid connection means, on the inside of the device.
Figure 9:
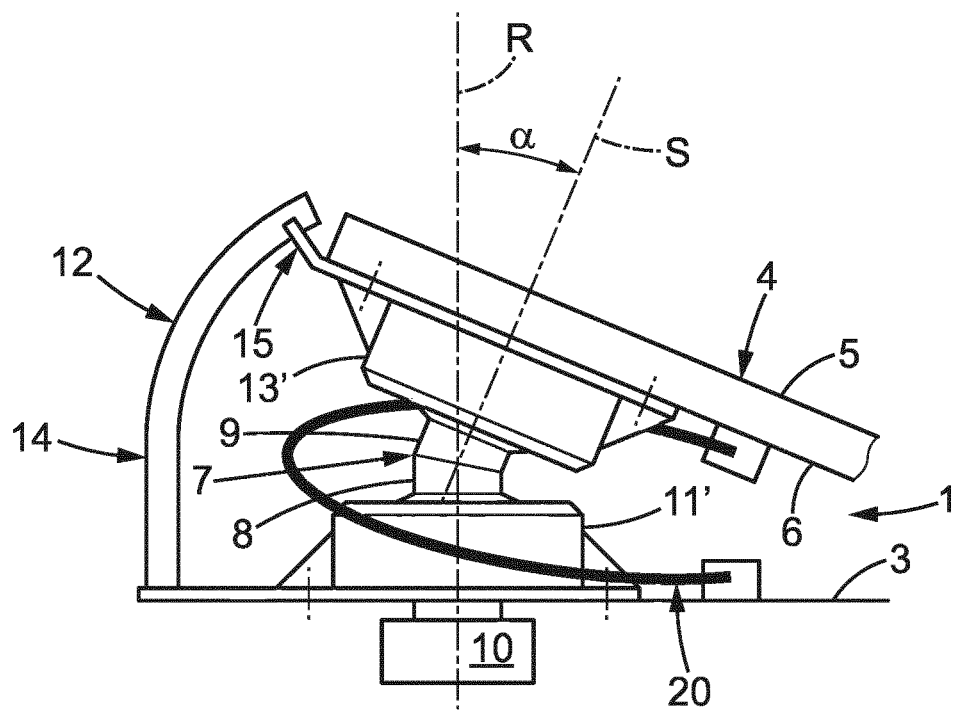
FIG. 9 is a complete view similar to that of FIG. 7, showing a variant embodiment of the fluid connection means, on the outside of the device.

The support member 7 thus makes it possible, by means of controlling the rotation about the single axis of rotation R, to keep the radiative surfaces 5, 6 parallel to the ecliptic plane. As a result, in particular, the fluid connection means between the panel 4 and the satellite 2 are simplified. For example (FIGS. 7 and 8), the fluid connection means comprise a circuit 19 inside the support member 7. The internal circuit 19 comprises at least two flexible pipes, namely a first pipe for the flow of a heat-transfer fluid from the satellite 2 to the panel 4 and a second pipe for the flow of the heat-transfer fluid from the panel 4 to the satellite 2. To this end, the two portions 8, 9 of the support member 7 are hollow, allowing the two pipes to pass between the satellite 2 and the panel 4. The pipes of the internal circuit 19 are then hidden inside the support member 7, which forms a protective sleeve for the flexible pipes. In a variant (FIG. 9), the fluid connection means comprise a circuit 20 outside the support member 7. As previously, the external circuit comprises at least two flexible pipes. The two flexible pipes of the external circuit 20 extend on the outside of the support member 7, between the satellite 2 and the panel. More specifically, in order not to obstruct the rotation of the support member 7, the pipes of the external circuit 20 describe a portion of a spiral, for example over one turn. Thus, as the panel 4 does not pivot, or only with a limited range of rotation, about the axis of rotation R but has simply a tipping movement, the flexible pipes of the internal circuit 19 and/or of the external circuit 20 are subject to low or no stress.

The insolation of the radiative faces 5, 6, which are parallel to the ecliptic plane, is thus zero. However, certain defects can render this parallelism imperfect, and lead to non-zero insolation on the radiative surfaces 5, 6. For example, the actual orbit of the satellite 2 can be slightly tilted relative to the geostationary orbit. It is also possible that the panel is slightly misaligned and/or be not entirely flat, for example due to an assembly fault or thermoelastic deformations, such that the operating angle α is not fully compliant. Thus, in order to overcome these defects simply, provision can be made to install a deflector over all of the edges of the panel 4. The deflector thus extends over the entire periphery of the radiative surfaces 5, 6, projecting relative to these surfaces 5, 6. The deflector blocks the sun's rays U that could have struck the radiative surfaces 5, 6.

FIGS. 10 to 20 show a third embodiment of the radiator 1 and its assembly means, on the north face 3 of the satellite 2. This embodiment has the specific feature of allowing the radiator 1 to adopt a folded position for the launch of the satellite 2, and a deployed position, which is the position in which the radiator 1 operates optimally.

In this third embodiment, which will now be described in detail, the assembly means comprise a mechanism for the deployment of the panel 4. The deployment mechanism comprises a hinge plate 21 mounted on the satellite 2, for example on the north face 3. The hinge plate 21 comprises means enabling it to be pivoted, relative to the north face 3 of the satellite 2, by the operating angle α. To this end, for example, the plate 21 is mounted on a hinge 22. Two legs 23, projecting vertically relative to the north face 3, are each connected to the hinge plate 21 by means of a connecting rod 24, hinged about axes parallel to the axis of the hinge 22. The hinge plate 21 supports the support member 7 and the system 12 for guiding the range of rotation.

The rail 14 of the guidance system 12 has two opposite, substantially smooth faces 25, rising substantially perpendicular to the north face 3 of the satellite 2, in order to guide the clamp-type element 15. More specifically, the clamp 15 comprises two arms 26, 27. A first arm 26 is rigidly fixed to the panel 4, for example on the outer ring of the second bearing 13. The second arm 27 is mounted pivoting about an axis 28, perpendicular to the axis of radiation S, on the panel 4, and for example on the housing 13' of the second bearing 13. The two arms, respectively 26, 27, extend towards each other to an end, respectively 26a, 27a. The distance between the two ends 26a, 27a of the arms 26, 27 is adjusted depending on the thickness of the rail 14, i.e. the distance between its two smooth faces 25, in order to adjust the range of rotation of the panel 4 about the axis of rotation R. For a zero range of rotation, the distance between the ends 26a, 27a of the arms is substantially equal to the thickness of the rail 14.

Figure 10:
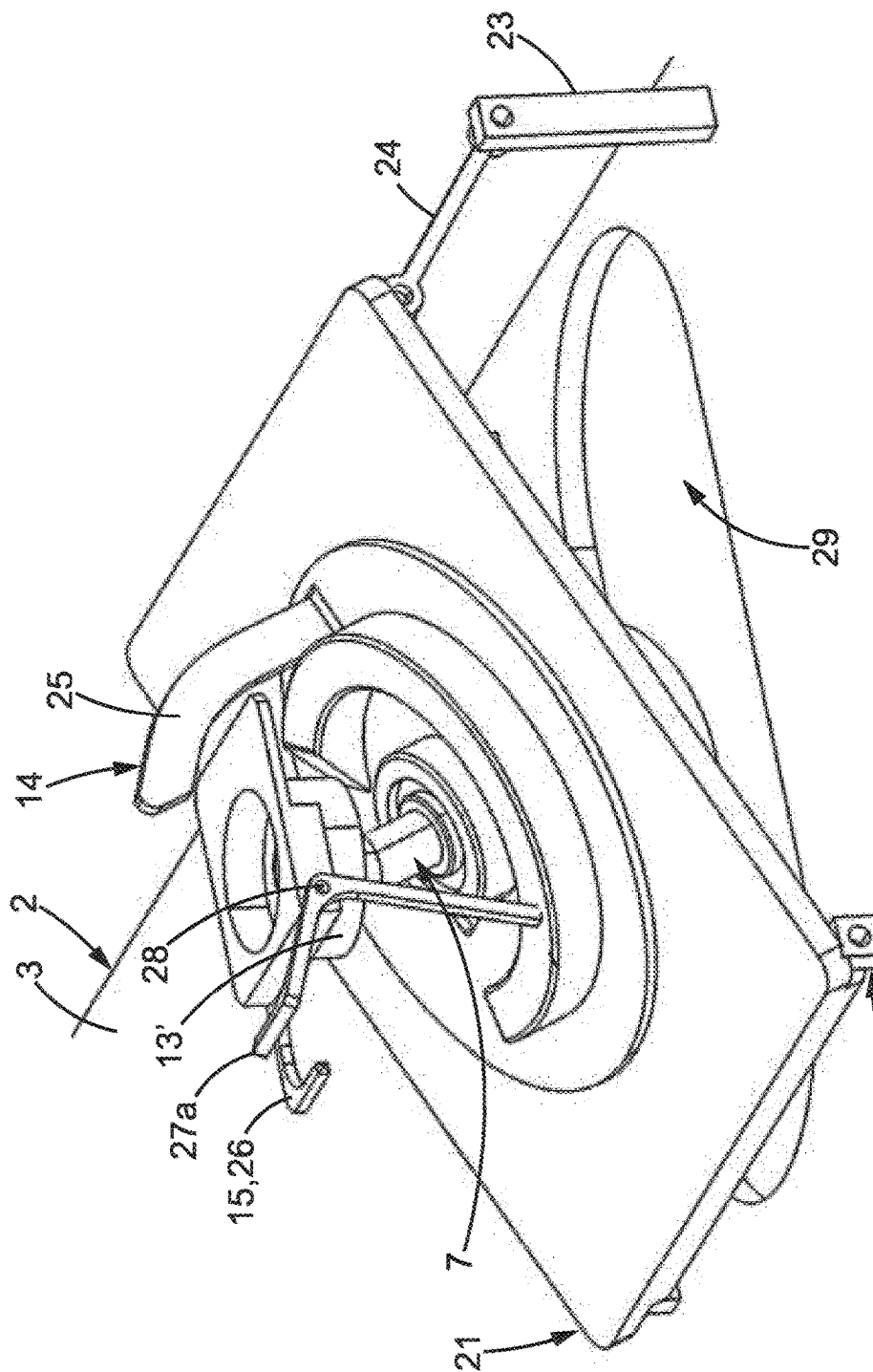
FIG. 10 is a detailed elevation view of the means for assembling the radiator on a face of the satellite, comprising a deployment mechanism in a first position, the radiator being shown without a panel.
Figure 11:
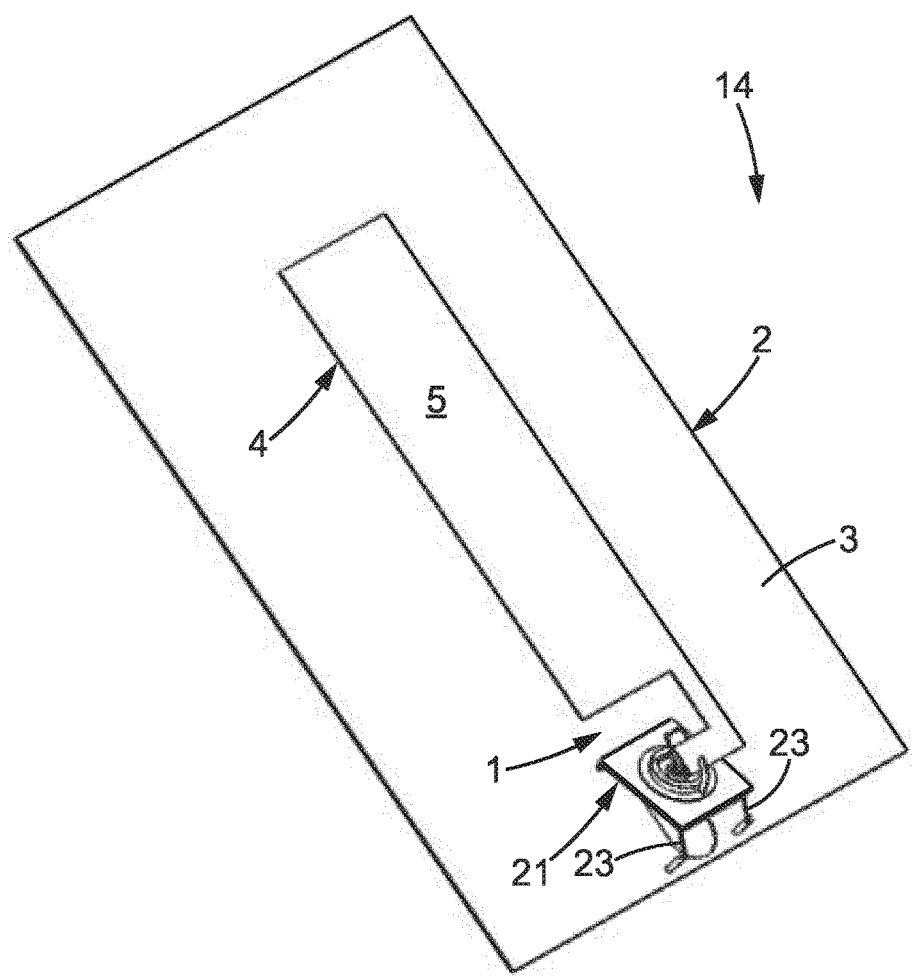
FIG. 11 is an elevation view of the radiator in the position in FIG. 10, with the panel.

The radiator 1 can then adopt a folded position, in which the panel 4 is above, and parallel to, the north face 3 of the satellite, i.e. a radiative face 6 is facing the north face 3 of the satellite. To this end, the deployment mechanism is initially in a first position, in which the hinge plate 21 is raised by the operating angle α relative to the north face 3, by rotation of the connecting rod 24 and the hinge plate 21 about the hinge 22 (FIGS. 10 and 11). Due to the tilt of the hinge plate 21, the tilt of the operating angle α of the radiative surfaces relative to the north face 3 is cancelled out. An opening 29 on the north face 3 of the satellite 2, uncovered when the radiator 1 is in the folded position, makes it possible in particular for the fluid connection means from the satellite to the panel 4 to pass through without the flexible pipes being obstructed by the movement of the hinge plate 21.

It should be noted that the guidance system 12 is then not operational, as the arms 26, 27 of the clamp 15 are not yet engaged with the rail 14. More specifically, when the radiator 2 is in the folded position, the arms 26, 27 are situated at 180° to the rail 14, about the axis of rotation R. Moreover, the ends 26a, 27a are not facing each other, but the second arm 7 is pivoted about its axis on the housing 13' of the second bearing 13, so as to distance its end 27b from the north face 3: the second arm 27 is lifted relative to the first arm 26.

Figure 12:
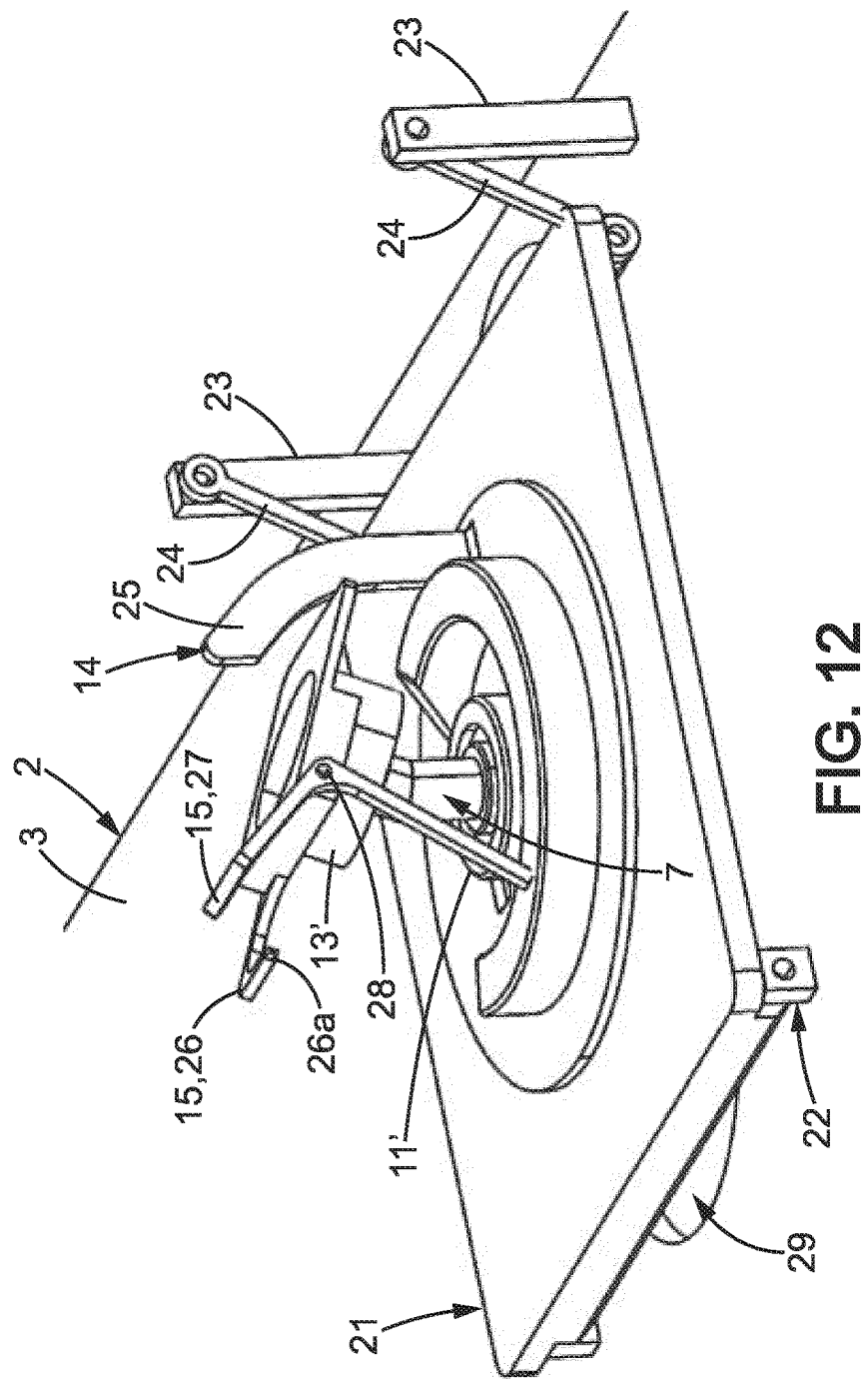
FIG. 12 is a view similar to that in FIG. 10, the deployment mechanism being in a second position.
Figure 13:
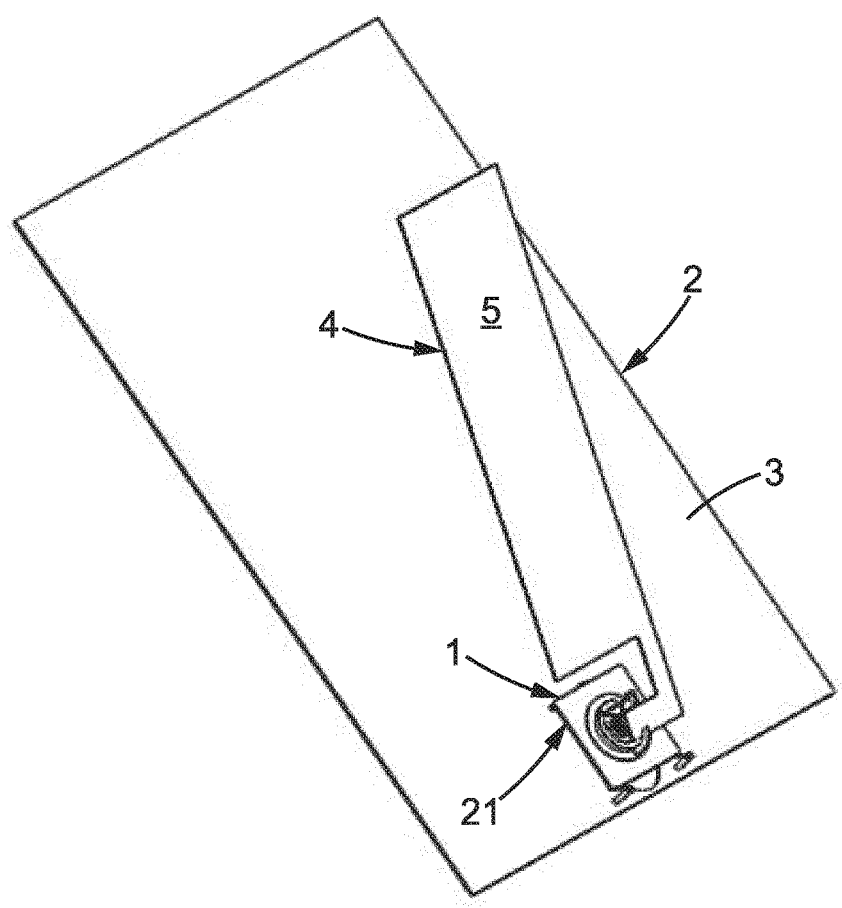
FIG. 13 is an elevation view of the radiator in the position of FIG. 12, with the panel.

In order to place the radiator in the deployed position, in which the panel extends beyond the north face 3 of the satellite and in which there is a plane in which the radiative faces 5, 6 form an operating angle α with the north face 3, the deployment mechanism is placed in a second position, in which the hinge plate 21 is folded back towards the north face 3 of the satellite, such that it is parallel to the north face 3 (FIGS. 12 and 13). The opening 29 on the north face 3 is then at least partially covered by the hinge plate 21. The radiative faces 5, 6 are no longer parallel to the north face 3, but are tilted by the operating angle α. Then, the support member 7 performs a 180° rotation about the axis of rotation R, in the direction in which the second arm 27 passes in front of the rail 14 before the first arm 26. As the guidance system 12 is not operational, the rotation of the support member 7 leads to the rotation of the panel 4, which moves in order to extend beyond the north face 3 of the satellite.

Provision may however be made not to fully fold back the hinge plate 21, which then forms an angle with the north face 3. The tilt angle between the radiative faces 5, 6 and the north face then corresponds to the operating angle α, from which the tilt angle between the hinge plate 21 and the north face 3 has been subtracted. It is thus possible to slightly adjust the tilt between the radiative faces 5, 6 and the north face 3 by a few degrees, in practice by +/−5°, without the operating angle α between the axis of rotation R and the axis of radiation S being modified thereby. The assembly means then help to compensate for the tilt of the orbit already mentioned above.

Figure 14:
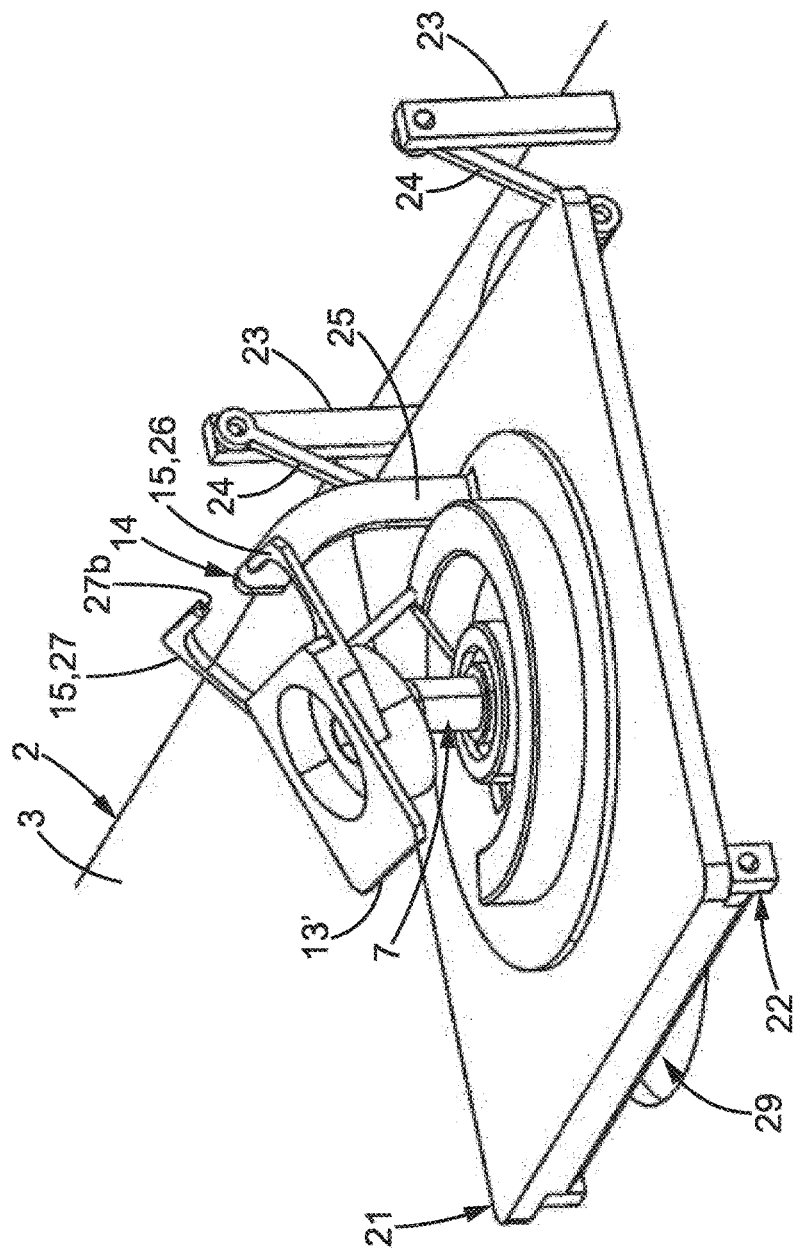
FIG. 14 is a view similar to that in FIGS. 10 and 12, the deployment mechanism being in a third position.
Figure 15:
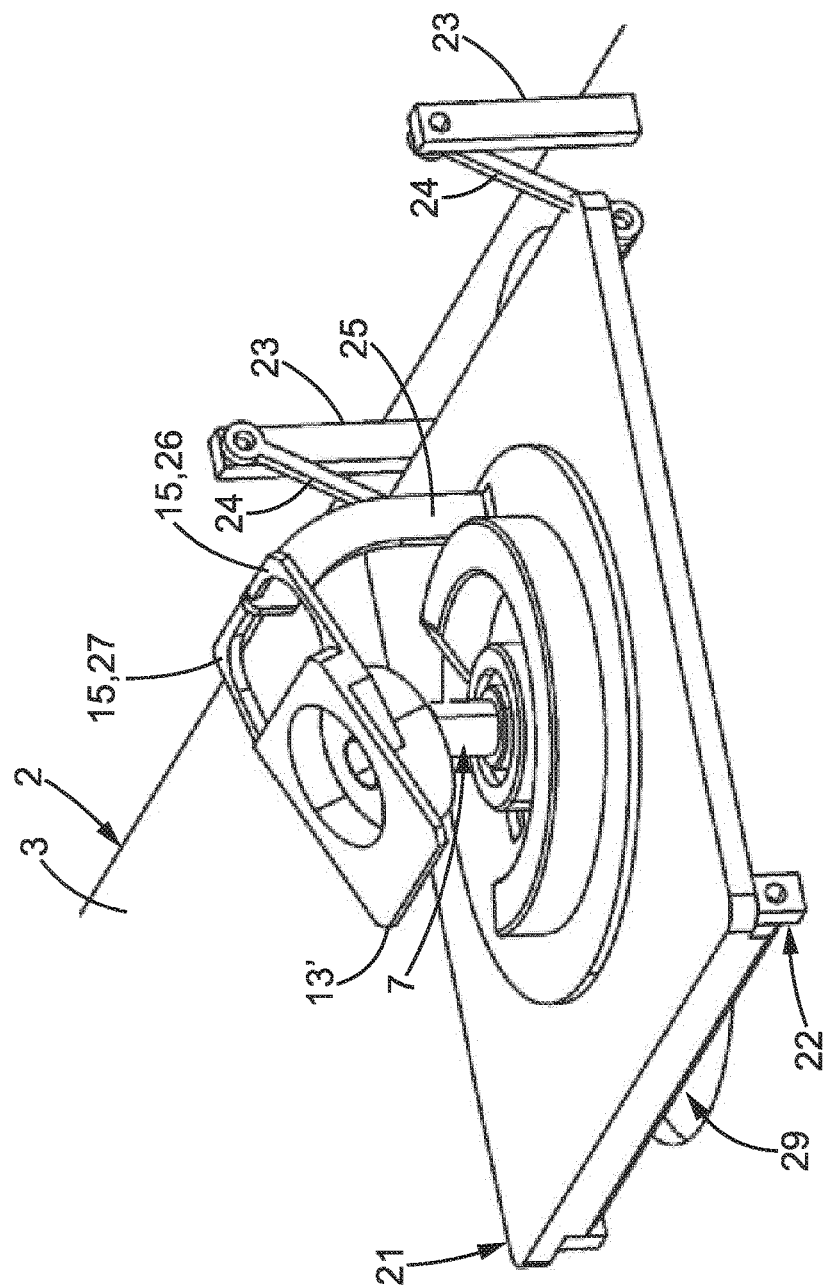
FIG. 15 is a view similar to that in FIGS. 10, 12 and 14, the deployment mechanism being in a fourth position.
Figure 16:
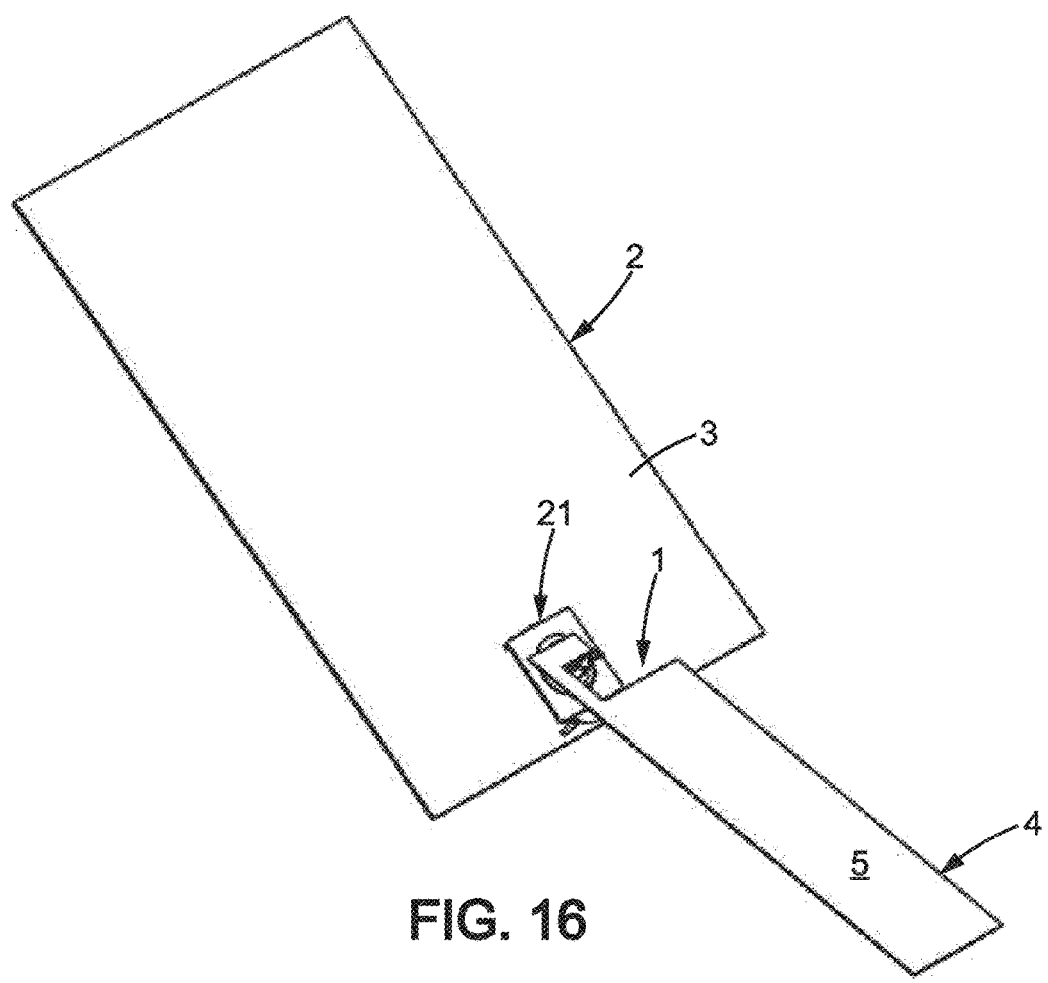
FIG. 16 is an elevation view of the radiator in the position of FIG. 15, with the panel.
Figure 17:
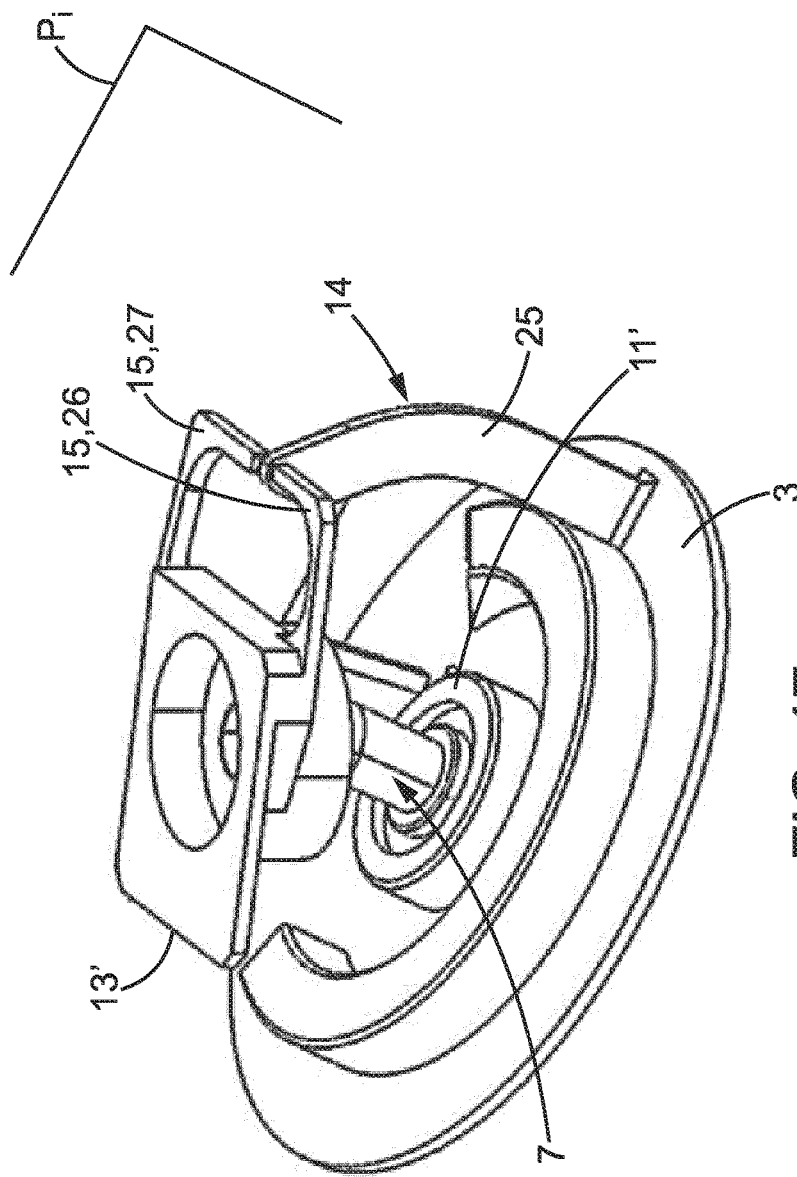
FIG. 17 is an elevation view of the radiator, without the panel, with the assembly means in the position of FIG. 15, from another angle.
Figure 19:
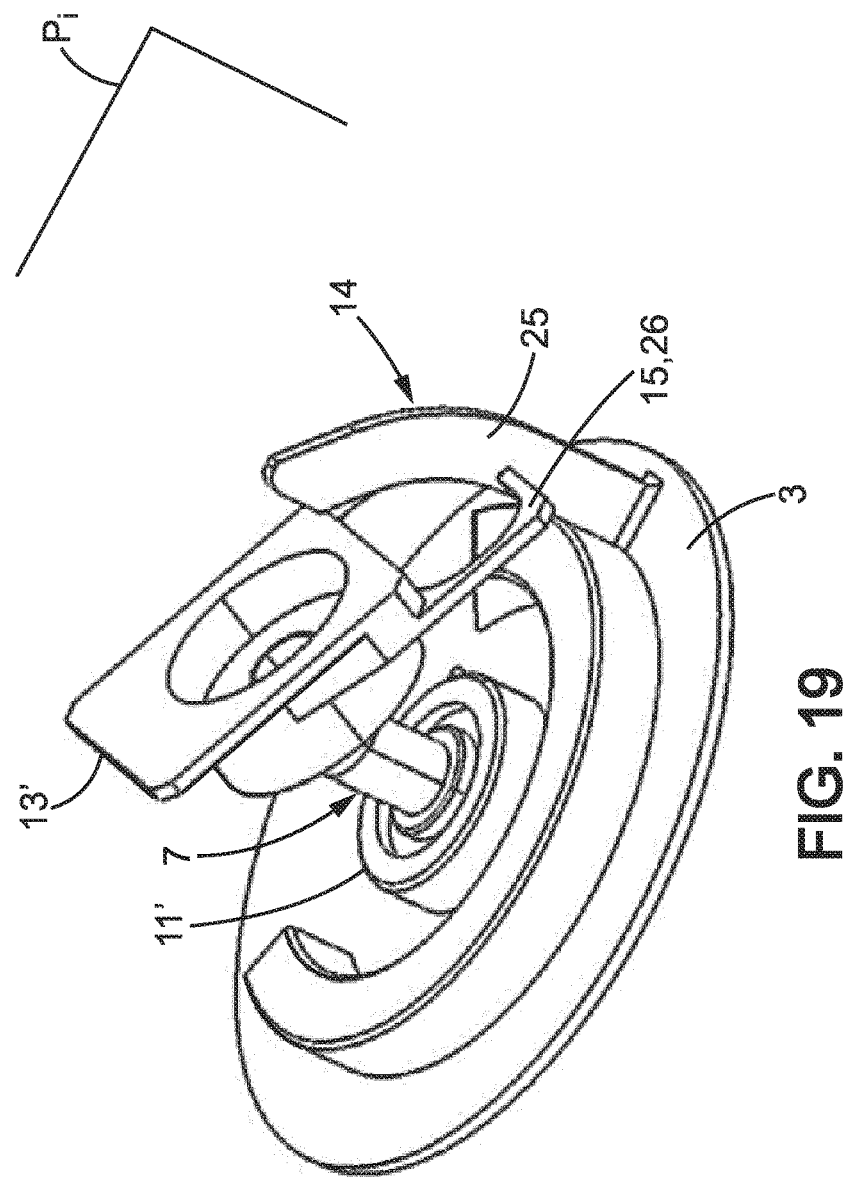
Figure 20:
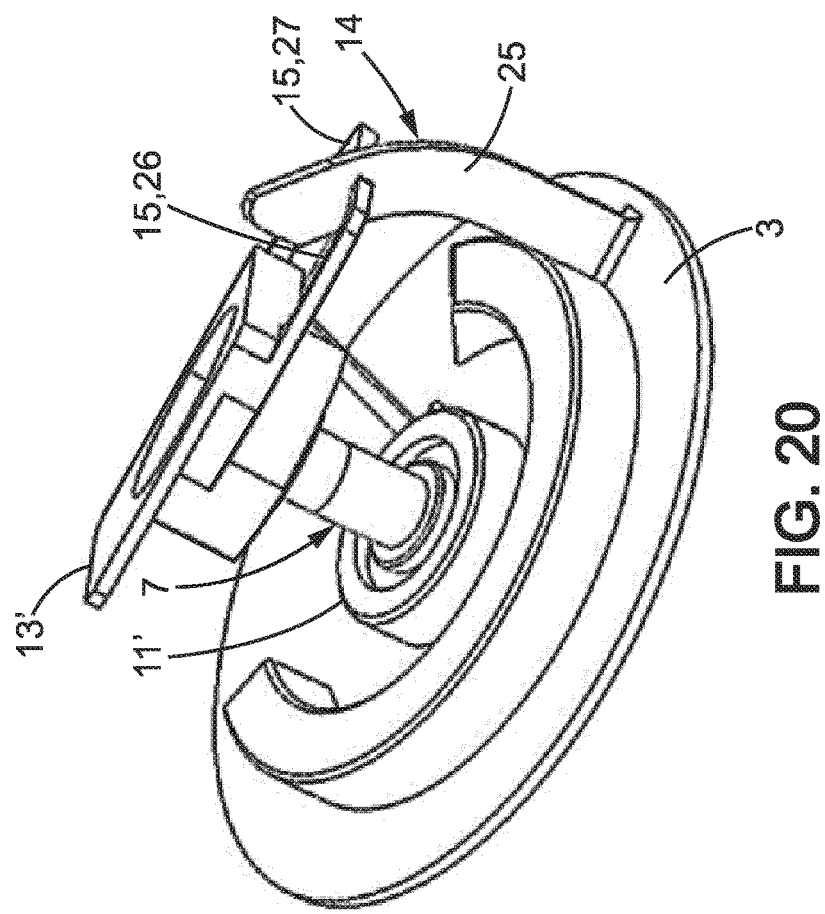

In a third position, once the member 7 has pivoted by 180°, the end 26a of the first arm 26 is located facing one of the faces 25 of the rail 14, the second arm having been able to pass beyond the rail 14 (FIG. 14). The second arm 27 is then lowered towards the north face 3 by rotation about its axis 28 on the housing 13' of the second bearing 13, such that its end 27a comes to face the other face 25 of the rail 14. Optionally, the ends 26a, 27a of the arms 26, 27 can be in contact with the surfaces 25 of the rail 14. However, in practice a minimum clearance is observed. The clamp 15 then grips the rail 14, rendering the guidance system 12 operational. The deployment mechanism is then in a fourth position (FIGS. 15 and 16) and it is secured in the latter position.

Starting from this fourth position, the radiator 1 can then pivot about the axis of rotation R in order to follow the orbit of the satellite 2, as previously described. FIGS. 17 to 20 show the movement of the support member 7, for four positions of the radiator 1 corresponding to the positions previously described, the panel 4 being removed on these figures in order to show the support member 7. In each of these figures, the plane $P_i$ is also shown, in which the tilt of the operating angle α between the radiative surfaces 5, 6 can be measured.

Control means, which can be included in the control and motorization means 10, make it possible to automate the transition from the folded position to the deployed position.

In the examples given, the operating angle α is taken to be equal to 23.5°, i.e. equal to the angle between the plane $P_g$ (equatorial plane) of the geostationary orbit and the ecliptic plane $P_e$. However, it may be the case that the satellite's mission allows a north-south drift in a tilted orbit. The satellite is then no longer exactly in the plane $P_g$ of the geostationary orbit, but in a tilted orbit plane, slightly tilted relative to the plane $P_g$ of the geostationary equatorial orbit.

The drift is predictable, and may be intentional. If nothing is done, the satellite naturally moves away from the equatorial orbit which tilts by the order of 1 degree per year. Certain missions, for example for navigation, authorise allowing the orbit to drift by a few degrees. Other missions of the internet or direct-broadcast satellite TV type do not allow any drift. The phenomenon is thus predictable and controlled depending on the type of mission.

In order to overcome this tilting and keep the radiative surfaces 5, 6 of the panel 4 of the radiator 1 parallel to the ecliptic plane $P_e$, the operating angle α is chosen to be greater than 23.5°. For example, when the predicted tilt is 3°, which is a maximum drift value, then the operating angle α is chosen to be equal to 26.5°. An intermediate compromise value could be chosen. The control and motorization means 10 then comprise an adjustment module, making it possible to modulate the speed of rotation of the support member 7 in order to compensate for the drift.

The radiator 1 described has a simple design as it involves control about a single pivot axis, in this case the axis of rotation R. The design costs, and also the maintenance costs, are reduced. Moreover, the support member 7 pivoting about the axis of rotation R has a small space requirement. Furthermore, once the operating angle α has been set during design, there is no need to implement means for adjusting the operating angle α in order to follow movements of the satellite 2 placed on station in orbit. Minor adjustments can be implemented to adjust the tilt of the radiative surfaces 5, 6 relative to the north and south faces of the satellite 2.

The invention claimed is:

1. Radiator (1) for a satellite (2) intended to be stationed in geostationary orbit around the earth (T) in a plane that is tilted relative to the ecliptic plane, the radiator (1) comprising at least one panel (4) having at least one radiative surface (5, 6), and comprising:
   a support member (7) bearing the at least one panel (4), control and motorization means (10) for pivoting the support member about an axis of rotation (R),
   the radiator being characterized in that the axis of rotation (R) is tilted relative to the at least one radiative surface (5, 6) and in that the at least one radiative surface (5, 6) of the at least one panel (4) is perpendicular to an axis of radiation (S), the axis of radiation (S) and the axis of rotation (R) being tilted relative to each other by a non-zero operating angle (α), corresponding to the tilt angle of the orbit plane of the satellite (2) relative to the ecliptic plane, the operating angle (α) being fixed, such that for any rotation of the support member (7) about the axis of rotation (R) using the control and motorization means (10), the at least one radiative surface (5, 6) remains parallel to the ecliptic plane.

2. Radiator (1) according to claim 1, in which the at least one panel (4) is mounted pivoting about the axis of radiation (S), the radiator (1) also comprising a system (12) for guiding the range of rotation of the at least one panel (4) limiting the rotation of the at least one panel (4) about the of axis rotation (R), so as to keep the at least one panel in a given orientation relative to the satellite (2).

3. Radiator (1) according to claim 2, in which the support member (7) comprises two portions (8, 9), namely:
   a first portion (8) capable of being mounted on a support face (3, 16) of the satellite (2),
   a second portion (9) on which the at least one panel (4) is mounted,
   the at least one panel (4) being mounted on the second portion (9) via a bearing (13) in order to allow the rotation of the at least one panel (4) about the axis of radiation (S).

4. Radiator (1) according to claim 3, in which the two portions (8, 9) of the support member (7) are rectilinear and each an extension of the other, the first portion (8) extending along the axis of rotation (R) and the second portion extending along the axis of radiation (S).

5. Radiator (1) according to claim 2, in which the system (12) for guiding the range of rotation comprises a rail (14), extending parallel to the axis of rotation (R) and a clamp (15) comprising arms, wherein the clamp is rigidly fixed to the at least one panel (4), the arms (26, 27) of the clamp (15) engaging with the rail (15) in order to limit the range of rotation of the at least one panel (4) about the axis of rotation (R).

6. Radiator (1) according to claim 1, in which the operating angle (α) is 23.5°.

7. Radiator (1) according to claim 1, in which the operating angle (α) is greater than 23.5° for operation in tilted orbit, the radiator (1) then also comprising means for modulating the speed of rotation of the support member (7).

8. Radiator (1) according to claim 1, in which the at least one panel (4) comprises two parallel radiative surfaces (5, 6) oriented in opposite directions.

9. Radiator (1) according to claim 1, in which the at least one panel (4) comprises a deflector placed over the entire periphery, projecting relative to the at least one radiative surface (5, 6), in order to block some of the sun's rays.

10. Radiator (1) according to claim 1, also comprising an attitude sensor linked to the control and motorization means (10) in order to pivot the support member (7), so as to verify and/or control the orientation of the at least one panel (4) relative to the sun.

11. Radiator (1) according to claim 1, comprising fluid connection means capable of being connected with a satellite (2), the fluid connection means including at least one internal circuit (19) comprising two flexible pipes passing on the inside of the support member (7) of the radiator (1).

12. Radiator (1) according to claim 1, comprising fluid connection means capable of being connected with a satellite (2), the fluid connection means including at least one external circuit (20) comprising two flexible pipes passing on the outside of the support member (7) of the radiator (1).

13. Satellite (2) capable of being placed in orbit around the earth, comprising at least one radiator (1) according to claim 1, mounted on a support face (3, 16) of the satellite (2), the support member (7) of the radiator (1) being fixed on the satellite (2) such that the axis of rotation (R) is perpendicular to a reference face of the satellite, the reference face being a north face (3) or a south face (17) of the satellite (2).

14. Satellite (2) according to claim 13, in which the radiator (1) can adopt a folded position in which the at least one panel (4) is against the support face (3, 16) of the satellite (2) on which it is fixed, and a deployed position in which the at least one panel (4) is brought into a position in which it is tilted relative to the support face (3, 16) by the operating angle (α).

15. Radiator (1) according to claim 3, in which the system (12) for guiding the range of rotation comprises a rail (14), extending parallel to the axis of rotation (R) and a clamp (15) comprising arms, wherein the clamp is rigidly fixed to the at least one panel (4), the arms (26, 27) of the clamp (15) engaging with the rail (15) in order to limit the range of rotation of the at least one panel (4) about the axis of rotation (R).

16. Radiator (1) according to claim 4, in which the system (12) for guiding the range of rotation comprises a rail (14), extending parallel to the axis of rotation (R) and a clamp (15) comprising arms, wherein the clamp is rigidly fixed to the at least one panel (4), the arms (26, 27) of the clamp (15) engaging with the rail (15) in order to limit the range of rotation of the at least one panel (4) about the axis of rotation (R).

17. Radiator (1) according to claim 2, in which the operating angle (α) is greater than 23.5° for operation in tilted orbit, the radiator (1) then also comprising means for modulating the speed of rotation of the support member (7).

18. Radiator (1) according to claim 3, in which the operating angle (α) is greater than 23.5° for operation in tilted orbit, the radiator (1) then also comprising means for modulating the speed of rotation of the support member (7).

19. Radiator (1) according to claim 4, in which the operating angle (α) is greater than 23.5° for operation in tilted orbit, the radiator (1) then also comprising means for modulating the speed of rotation of the support member (7).

20. Radiator (1) according to claim 5, in which the operating angle (α) is greater than 23.5° for operation in tilted orbit, the radiator (1) then also comprising means for modulating the speed of rotation of the support member (7).

* * * * *